Sept. 28, 1954 E. L. SWARTZ 2,690,479

OVERFLOW ARRANGEMENT FOR LINE FINDERS IN TELEPHONE SYSTEMS

Filed Oct. 15, 1952 2 Sheets-Sheet 1

*INVENTOR.*
EDWARD L. SWARTZ

BY Mc Walter Owen

ATTY.

Sept. 28, 1954 E. L. SWARTZ 2,690,479

OVERFLOW ARRANGEMENT FOR LINE FINDERS IN TELEPHONE SYSTEMS

Filed Oct. 15, 1952 2 Sheets-Sheet 2

OVERFLOW SHELF

INVENTOR.
EDWARD L. SWARTZ

BY Mc Walter Owen

ATTY.

Patented Sept. 28, 1954 2,690,479

UNITED STATES PATENT OFFICE 2,690,479

OVERFLOW ARRANGEMENT FOR LINE FINDERS IN TELEPHONE SYSTEMS

Edward L. Swartz, Princeton, Ill., assignor to Automatic Electric Laboratories, Inc., Chicago, Ill., a corporation of Delaware Application October 15, 1952, Serial No. 314,857

12 Claims. (Cl. 179—18)

This invention relates to telephone systems and more particularly to the provision of overflow service in the linefinder stage of such systems.

If in a given installation the traffic originating in a group of line circuits, for example because of an unexpected party-line development, becomes too great to be handled by the associated group or shelf of line finders when fully equipped it is the usual practice to provide an overflow shelf mounting a number of additional line finders. The bank multiple of the regular finders is extended to the banks of the overflow finders and these last-mentioned finders are connected to spare contacts in the banks of the distributor associated with the regular finders to be allotted in sequence thereby.

While this method of providing overflow relief is satisfactory in many cases it poses difficulties where no space is available adjacent the existing regular finder group for mounting the overflow group or shelf of finders, because in that case the bulky multiple cable has to be run from the regular finder shelf to the relatively distant overflow shelf. Moreover the aforementioned arrangement fails when sufficient spare contacts in the distributor banks are not available. If there is more than one group of finders and a plurality of such groups are overloaded, then a corresponding number of separate overflow finder groups of the above type must be provided.

An alternative way of coping with an excessive incidence of outgoing line traffic due to unforeseen party-line growth or similar causes would be to simply add one or more regular finder groups or shelves, and eliminate some of the line circuits in the existing groups and assign to the corresponding lines line circuits associated with the added finder groups. However, moving a line circuit from one location to another presents cabling difficulties, particularly where no intermediate distributing frame or similar cross-connecting means is provided between the line equipment terminals and the connector bank terminals.

It is a principal object of the invention to provide an overflow arrangement for line finders in which the above difficulties are overcome.

Another object of the invention is to provide means, whereby mutual overflow relief of one kind or another may be given between main groups or shelves of line finders.

Another object of the invention resides in the provision of simple and efficient means, whereby one finder group or shelf affords overflow relief to a plurality of main finder groups or shelves in common.

Still another object of the invention resides in the provision, in connection with a group of line finders serving a plurality of subgroups of line circuits facilities for assigning different other groups of line finders for use by different ones of said subgroups when all finders of the first-mentioned group are busy.

According to one feature of the invention there is provided for overflow purposes a line finder group or shelf preferably of the general type used in the exchange under consideration which has its own common equipment including the necessary allotter means but need not have any line circuit equipment physically associated therewith. The finders of this overflow shelf are given access, through added multiple cabling, to as many subgroups of the line circuits served by the existing overloaded finder group or groups as are necessary to relieve this overload, and the overflow shelf is equipped with as many finders as are required to handle the excess traffic to be diverted into it. Thus, the specially wired subgroups are accessible not only by the finders of their respective regular group, but by way of the aforementioned multiple cabling, also by the finders of the overflow group. Assuming, for example, that line finders of the Strowger two-motion type are used throughout the installation in question, one or two levels of line circuits in each of the overloaded groups may be specially wired in this manner.

According to another feature of the invention the start and level marking conductor of each of these special subgroups is carried over to the overflow shelf so that normally upon initiation of a call in one of these subgroups, an idle overflow finder is caused to search for a calling line in the level so marked. Furthermore, there is provided a transfer relay which when all overflow finders have been taken into use functions to switch the aforementioned start and level marking conductor from the start and level control means of the overflow finder shelf to those of the respective regular finder shelf. Therefore, when a call is initiated on a line in one of the special subgroups under such an all-overflow-finders-busy condition, an idle finder of the respective regular group is started in search of a calling line in the marked level.

In this manner there is provided an overflow shelf which serves if necessary a number of regular shelves in common. As the traffic peaks are unlikely to occur at exactly the same time in the different line groups, this arrangement results in a reduction of the total number of overflow finders and associated selectors which are required in a given exchange.

Except for the omission of the line circuits no special design is necessary for the overflow shelf and only multiple cables of small size which can readily be added are required for connecting this shelf with the individual regular shelves. Moreover, even though all overflow finders are busy, a call normally handled by these finders is not lost but is assigned, under this condition, for service by the finders of the respective regular group. Thus, an arrangement is provided in which, in addition to the overflow finders providing overflow relief of one kind to the regular finders, the last-mentioned finders also give overflow assistance of another kind to the oveflow finders. From a different point of view this results in a system in which in the case of all finders of a certain group, viz the overflow groups, being busy calls from different subgroups of lines normally served by this finder group are automatically transferred to the different other groups of finders.

The invention, both as to its organization and method of operation, together with other objects and features thereof, will best be understood by reference to the following specification taken in connection with the accompanying drawings.

Figure 1:
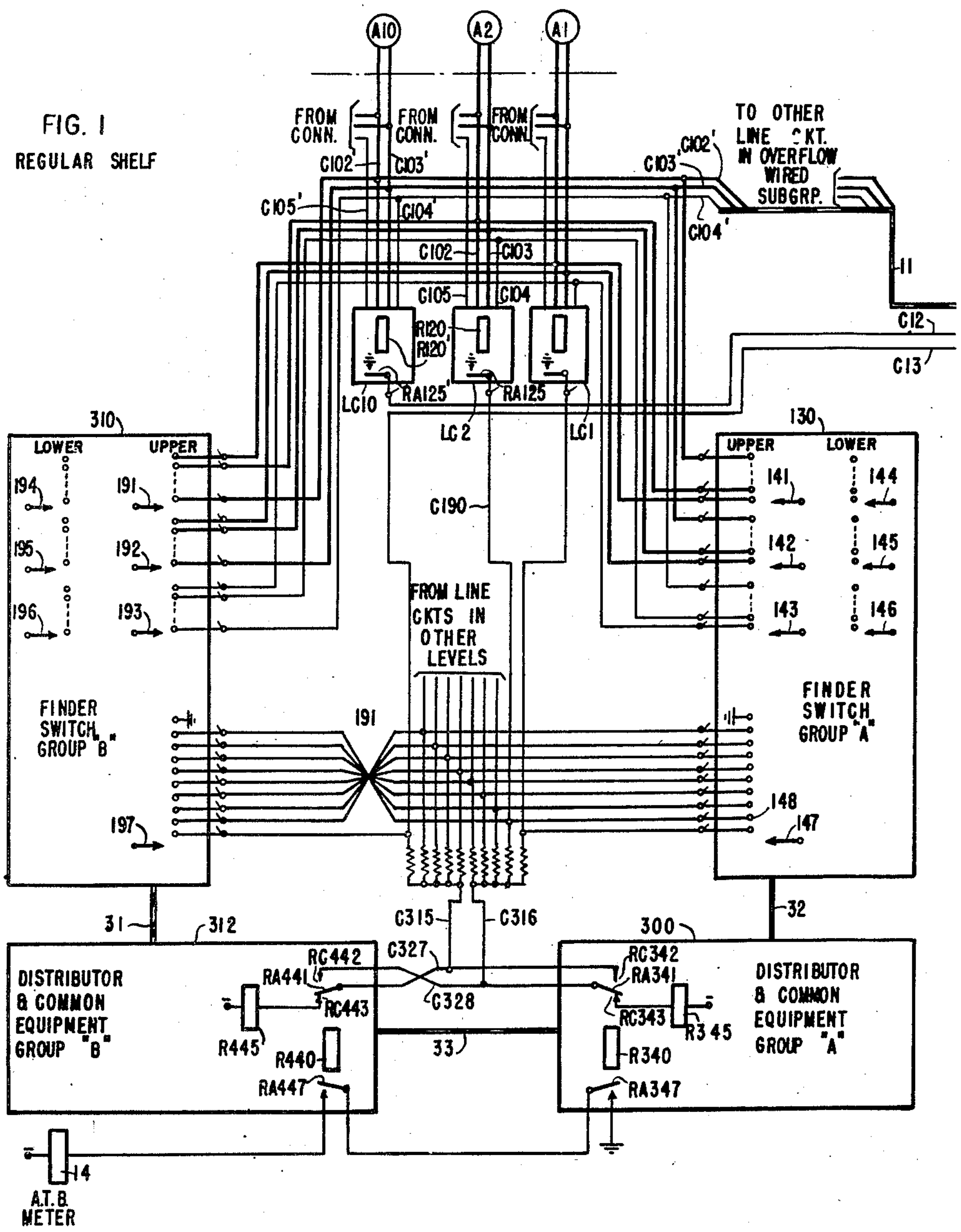
Fig. 1 is a schematic diagram of a regular finder shelf together with the line circuits and subscriber's lines associated therewith.
Figure 2:
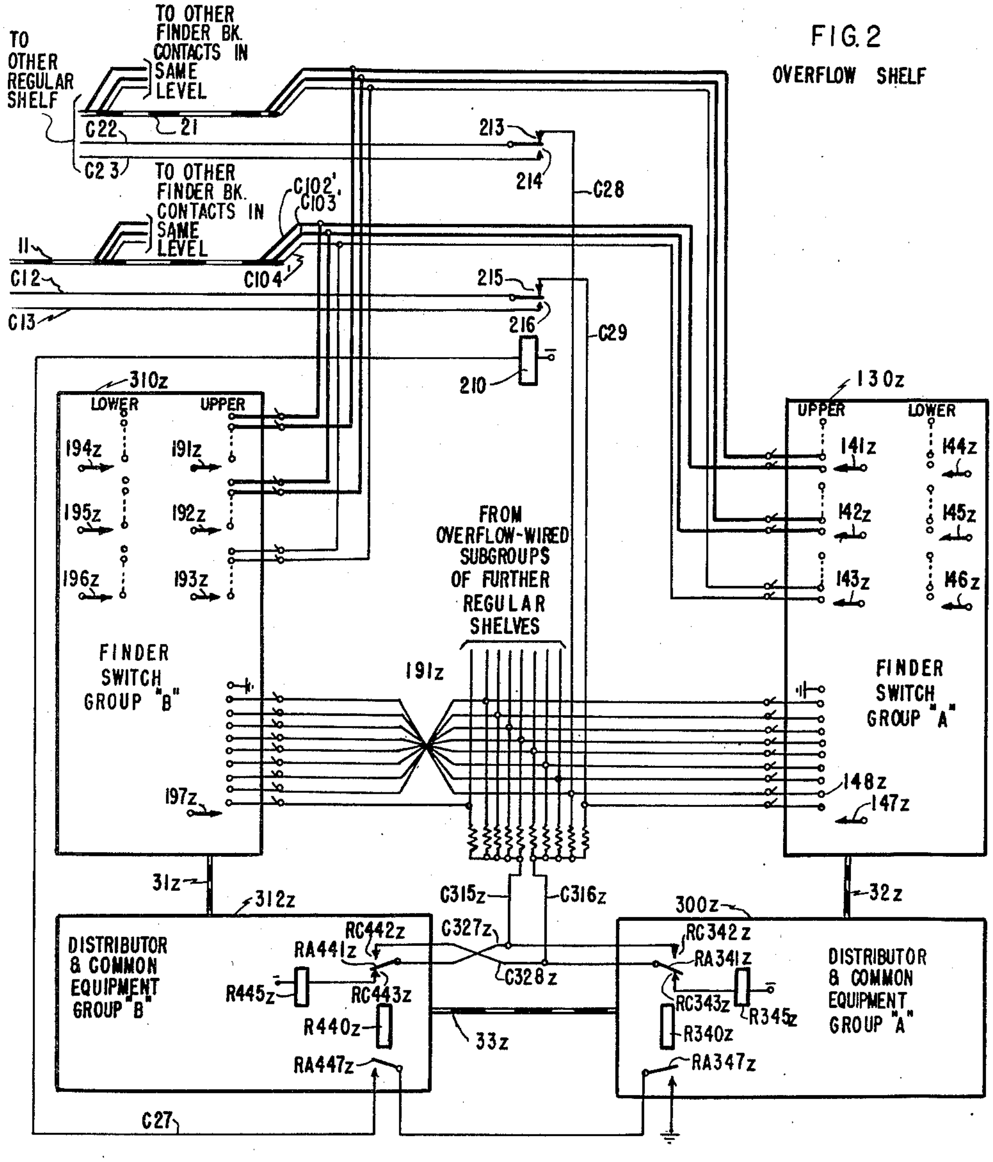
Fig. 2 is a schematic diagram of an overflow shelf provided in common for a plurality of regular shelves, together with the associated transfer relay.

Fig. 2 should be placed to the right of Fig. 1 in order for these figures to form a complete circuit diagram.

The embodiment shown in the drawings illustrates the invention as applied to a finder system of the type in which each finder shelf or group comprises two component groups which mutually aid each other in carrying the traffic originating in the group as a whole. A twin shelf or group of this kind is disclosed for example, in U. S. Patent No. 2,214,908 issued on September 17, 1940, to C. E. Lomax et al., reference being made to this patent for details of circuit design.

Referring to Fig. 1, there is shown in diagrammatic form a regular line finder shelf of the character shown and described in the Lomax patent. Wherever possible Fig. 1 uses the same reference numerals as U. S. Patent 2,214,908 for the designation of corresponding parts.

In Figure 1 of the present application the two component groups of finders referred to above are designated as group A and group B, respectively, the maximum capacity of each of these two component groups, for example, being ten finders. As in the Lomax patent, these line finders are of the Strowger two-motion type having two sets of wipers and corresponding contact banks. Taking, for instance, the case of finder 130 which belongs to finder group A, this finder has a first or upper set of wipers comprising line wipers 141, 142 and test wiper 143 and a second or lower set of wipers comprising line wipers 144, 145 and test wiper 146, all these wipers being mounted on a common shaft. Each of the aforementioned switch wipers is engageable with any of its associated 100 bank contacts, 10 bank contacts for each of the ten levels of the switch. In order to simplify the drawing, only the contacts corresponding to the first rotary position in the various levels have being shown. Figure 1 also illustrates schematically one finder switch 310, from the B group of line finders mounted on this shelf, this switch having a first wiper set comprising wipers 191—193 and a second set comprising wipers 194—196. Each finder in both component groups also is equipped with a vertical wiper engaging a corresponding set of vertical bank contacts, the vertical wiper of finder 130 being designated 147 and that of finder 310 being designated 197.

Individually associated with each finder is a selector, for instance, of the type shown in Fig. 2 of the Lomax patent, each finder and its associated selector forming a link. As the selectors are not a subject of the present invention and as they are mounted separately from the finder shelves it was believed unnecessary to show the selectors in the instant drawings.

Each component group of finders has associated therewith a common equipment group including a distributor switch, not shown, the common equipment for group A being designated by reference numeral 300 and that for group B by reference numeral 312. As may be seen from Figures 1 and 3 of Patent 2,214,908 each of these common equipment units is connected with each finder of the associated component group by a number of conductors. These conductors are schematically indicated in Fig. 1 of the present application by cables 32 and 31 which respectively connect the common equipment unit 300 with the illustrated finder 130 and the common equipment unit 312 with the illustrated finder 310. Common equipment units 300 and 312 are connected with each other by conductors C327 and C328 and by a number of other conductors which in Fig. 1 are summarily indicated by a cable 33.

Also mounted on the finder shelf shown in Figure 1 is the relay equipment of the 200 line circuits served by the finders of this shelf. These 200 line circuits are divided into two component groups of 100 line circuits each. As described in Lomax Patent 2,214,908 the finders of each of the two component groups have access to all 200 line circuits, the first component group of 200 line circuits however being normally served by component finder group A and the second component group of 200 line circuits being normally served by component finder group B. Each of the two component groups of 200 line circuits is divided into five subgroups of twenty line circuits each corresponding to one level, upper and lower, of the finder switches, these ten subgroups being connected to the ten levels of the A finders in straight order and to the ten levels of the B finders in reverse order. In this way each finder reaches any line of the component 100-group associated with and normally served by it, by a maximum number of five vertical steps whereby the hunting time of the finder switches is held to a minimum.

In Figure 1 only one line circuit, LC1 of subgroup one, one line circuit, LC2, of subgroup two, and one line circuit, LC10, of subgroup ten have been shown, these line circuits serving substations A1, A2 and A10 respectively. Each of these line circuits comprises a line relay, a cut-off relay and if desired a meter relay as shown in Figure 1 of Patent 2,214,908, only the line relay being schematically indicated in Figure 1 of the present application. Referring more particularly to line circuit LC2, this circuit includes a line relay R120 having, among others, a make contact with the armature spring RA125 which is connected to the start and level marking conductor C190 associated with the second subgroup or level of line circuits. As shown in Fig. 1, line circuit LC2 is connected by way of multiple conductors C102, C103 and C104 to the first contact set in the second upper level of the A finders and the first contact set in the ninth upper level of the B finders. This line circuit is also connected to connector banks, not shown, by way of multiple conductors C102, C103 and C105.

Line relay R120' and armature RA125' of line circuit LC10 correspond to line relay R120 and armature RA125 of line circuit LC2 respectively, and multiple conductors C102' to C105' of line circuit LC10 have their counterpart in multiple conductors C102 to C105 respectively of line circuit LC2. Multiple conductors C102'—C104' are shown connected to the first contact set in the tenth upper level of the A finders and to the first contact set in the first uppers level of the B finders. The multiple conductors associated with line circuit LC1 are wired in a similar manner.

As will be clear from Figure 1, conductor C190 which is the start and level marking conductor common to all line circuits, including line circuit LC2, of subgroup two is connected to the second contact, designated 148 in the case of finder 130, in the vertical bank of each of the A finders and to the ninth contact in the vertical bank of each of the B finders. The start and level marking conductors of the other subgroups are connected to their corresponding vertical bank contacts, by means of circuit network 191, in a similar manner except that the 10th contact of the vertical bank of all finders is connected to direct ground and that the start and level marking conductor associated with the line circuits such as LC10 of subgroup ten is split by way of conductors C12, C13 in a manner explained in detail hereinbelow.

As also shown in Figure 1 the start and level marking conductors of subgroups 1–5 are multipled through five individual resistances to a first common start conductor C316 and the start and level marking conductors associated with subgroups 6–10 are multipled by way of five other individual resistances to a second common start conductor C315. Start conductor C316 is connected by way of armature spring RA341 and back contact RC343 of a transfer relay R340 to a start relay R345, both these last-mentioned relays being associated with common equipment unit 300 which controls the line finders of group A. Therefore, upon initiation of a call on any of the 100 lines in subgroups 1–5 an idle A finder which has been preselected by the distributor, not shown in Figure 1, of common equipment unit 300, is started in search for a line in calling condition in the level marked via the start and level marking conductor associated with the subgroup of the calling line. For details of the corresponding circuit operations reference is made to the circuit description in the above-mentioned Lomax et al. patent.

Similarly, when a call originates in any of the 100 lines in subgroups 6–10 start relay R450 of common equipment unit 312 is operated by way of the other common start conductor C315, conductor 327 and contacts RA441, RC443 of a transfer relay R440 to cause an idle B finder preselected by the distributor switch in unit 312 to search for a line in calling condition in the level marked. It will be seen therefore that a call in the second component group of 100 line circuits can be extended by one of the B finders concurrently with the extension by one of the A finders of a call originating in a line of the first component group of 100 line circuits. Thus the two component groups of line finders normally serve the respective two component groups of line circuits separately and independently of each other.

Transfer relay R340 is normally held in operated condition from multiple grounds extended to it by the individual finders of group A by way of a conductor in cable 32. If all finders of this group have been taken into use all of these ground connections are removed so that transfer relay R340 releases. Relay R340 upon restoring at RA341 disconnects start relay R345 of common equipment unit 300 from the associated common start conductor C316 and connects this last-mentioned conductor by way of contact RC342, conductor C327 and contact RA441, RC443 to the start relay R445 of the other common equipment unit, 312. Under this condition this last-mentioned unit will function to start an idle finder of group B in response to any call originating in either the first or the second component group of line circuits. In a similar manner transfer relay R440 in common equipment unit 312 releases when all finders of group B are busy, thereby connecting common start conductor C315 by way of conductor C327, contact RA441, RC442 and conductor C328 to start relay R345 of group A; as a consequence calls originating in any of the ten subgroups of line circuits will be handled by the A finders as long as the group of B finders remains busy.

As described in Patent 2,214,908 transfer relay R340, or R440 as the case may be, is also caused to release under the control of a timer apparatus when an allotted finder of the associated component group due to a fault condition fails to find a calling line within a predetermined time interval. Under this unstandard condition, too, the release of the transfer relay causes the associated common start conductor to be connected together with the common start conductor of the other component finder group, whereupon all lines in both component groups are served by the finders of the last-mentioned finder group. The finder group containing the defective finder is locked out and this lockout condition is removed only when an attendant after remedying the unstandard condition operates a manual switch.

As shown in Figure 1 transfer relay R340 has an armature contact RA347 and an associated back contact and transfer relay has as an armature spring RA447 and an associated back contact, these contacts not being shown in the drawings of Patent 2,214,908. An all-trunks-busy meter 14 also not shown in the last-mentioned patent is connected in a circuit extending through the aforementioned additional contacts of the two transfer relays in series. This meter 14 therefore is operated each time an all-finders-busy condition arises in groups A and B simultaneously, thereby indicating the busy condition of the line finder shelf as a whole.

It will now be assumed that because of an unexpected increase in the traffic outgoing from the group of subscriber's lines shown in Figure 1, for instance due to rapid party line development, the twenty finders which constitute the total capacity of this finder shelf prove insufficient to carry this traffic load, as indicated, for example, by all-trunks-busy meter 14. To relieve this overload condition there is provided in accordance with the invention an overflow shelf of the kind shown in Fig. 2 and one or more subgroups of the line circuits mounted on the regular shelf, Figure 1, are connected by a multiple cable to the bank contacts of the overflow finders, Figure 2. In the embodiment described herein it has been assumed that the overload of regular shelf, Fig. 1, can be sufficiently relieved by thus wiring a single one of the subgroups, namely subgroup 10, for such overflow service. Accordingly all line circuits such as circuit LC10 of this subgroup, hereinafter referred to as the "overflow-wired" subgroup are connected by way of multiple cable 11 to the finder banks of the overflow shelf, Figure 2.

This overflow shelf may be generally of the same design as the regular finder shelf, Figure 1, and this similarity between overflow shelf and regular shelf has been indicated by the use in Fig. 2 of the same reference characters for corresponding parts as in Fig. 1 except that the suffix *z* has been appended to the reference characters in Fig. 2. Thus the overflow finders also are divided into two component groups each served by its own common equipment unit but with mutual aid provided between the two component groups.

However, the overflow shelf does not mount any line circuits. Instead, the overflow-wired line circuits of the regular shelves constitute the line circuits served by the overflow finders, Fig. 2. As shown in this figure, another multiple cable, 21, connects the banks of the overflow finders with an overflow-wired subgroup from another regular shelf or main group. More particularly the multiple conductors, such as conductors C102'—C104' associated with line circuit LC10, of the overflow-wired subgroup ten of the regular shelf, Fig. 1, are wired by way of cable 11 to bank contacts in the first upper level of the "A" overflow finders and bank contacts in the tenth upper level of the "B" overflow finders; and the multiple conductors of the overflow-wired subgroup from the above-mentioned other regular shelf are wired by way of cable 21 to bank contacts for example in the second upper level of the "A" overflow finders and, correspondingly, the ninth upper level of the "B" overflow finders. Generally speaking, the overflow finder banks will be connected by cable such as 11 and 21 to one or more overflow-wired subgroups of line circuits from as many regular shelves as require overflow relief. The overflow finder shelf, Fig. 2, thus serves all these regular shelves in common.

The number of equipped overflow finders will depend, of course, on the number of overflow wired subgroups served by the overflow shelf or, more generally, by the amount of overflow traffic thus to be diverted into this shelf. Thus if this amount of traffic is only slight one component group of overflow finders will suffice and the B group of overflow finders and its associated common equipment unit need not be furnished. Associated with each overflow finder is an overflow selector. These overflow selectors which may again be of the type shown in Fig. 2 of Patent 2,214,908, are mounted on a separate selector shelf.

As shown in Fig. 2 there is associated with the overflow shelf and preferably mounted thereon an additional transfer relay 210 having two sets of break-make contacts, the first set 215, 216 serving to switch the start and level marking conductor of the overflow wired subgroup No. 10 of the regular shelf, Fig. 1, and the other set 213, 214 similarly serving to switch the overflow wired subgroup of the aforementioned other regular shelf which is not shown in the drawings. The upper or line circuit end, Fig. 1, of the start and level marking conductor associated with subgroup 10 of the regular shelf, Fig. 1, is normally connected by way of conductor C12 and break contact 215 of relay 210 to start and level marking conductor C29 which is associated with the first A finder level of the overflow shelf. Similarly the line circuit end of the start and level marking conductor not shown of the overflow wired subgroup of the other regular shelf referred to above is normally connected by way of conductor C22 and break contact 213 of relay 210 to the start and level marking conductor C28 associated with the second A finder level and the ninth B finder level of the overflow shelf.

In the operation of the system, when a call is originated in any line in the overflow wired subgroup 10 of the regular shelf start relay R345*z* of the common equipment unit A of the overflow shelf is energized in the following circuit, ground, make contact and armature spring such as RA125' of a line relay such as R120' of a line circuit such as LC10 of the overflow wired subgroup, Fig. 1, conductor C12, contact 215, Fig. 2, conductor C29 and its associated resistance, common start conductor C316*z*, RA341*z*, RC343*z*, winding of start relay R345*z*, battery. This relay upon operating will cause an allotted finder, for instance 130*z*, of overflow group A to start in search for a calling line in the marked level namely level 1.

When this finder has found the calling line, this line is extended by way of conductors C102' and C103' in cable 11 and wipers 141*z* and 142*z* of the overflow finder in the first rotary position of the first level to the line relay, not shown, of the associated overflow selector and may thence be further extended, under the control of the dial at the calling substation, to a desired substation in any conventional manner. Similarly when a call originates in the overflow wired subgroup of the aforementioned other regular shelf, not shown, ground will be connected by way of conductor C22, break contact 213, conductor C28 and its associated resistance, common start conductor C316*z*, RA341*z*, RC343*z*, to the winding of start relay R345*z* and battery. In this case also an allotted finder, for example 130*z*, of overflow group A will be started and since in the present instance marking ground is applied, by way of conductor C28, to the second contact 148*z* in the vertical bank of this finder the finder will search for a line in calling condition in the second level.

The calling line in the other regular group is thus extended via the corresponding multiple conductors in cable 21 and wipers 141*z*, 142*z* of overflow finder 130*z* in the corresponding rotary position of the second level to the associated overflow selector.

It will be understood that the overflow wired subgroups of the individual regular shelves may be connected to the different levels of the A overflow finders and the corresponding complementary levels of the B overflow finders in any desired order. It will be further understood that when both component groups of overflow finders are furnished start relay R345*z* will normally be operated in response to a call from an overflow wired subgroup connected to levels 1–5 of the A overflow finders only; and that start relay R445*z* which is associated with common equipment unit 312*z* will normally be operated in response to a call from an overflow wired subgroup connected to levels 6–10 of the A overflow finders, that is 1–5 of the B overflow finders, only. It will also be clear that if one of the two component overflow groups is busy the release of the corresponding transfer relay, R340z or R440z, will cause calls originating in any of the overflow wired subgroups to be handled by the finders of the other component overflow group.

As shown in Fig. 2 transfer relay R340z is equipped with an additional contact having the armature spring RA347z and transfer relay R440z with an additional contact having the armature spring RA447z. The aforementioned transfer relay 210 is connected in a circuit extending in series through the last-mentioned additional contacts. Therefore, when both relays R340z and R440z are in a restored condition due to all overflow finders of both component groups being busy relay 210 will operate thereby opening its break contacts 213, 215 and closing its make contacts 214, 216. It will be understood, of course, that relay 210 has as many sets of contacts as there are overflow wired subgroups served by the overflow shelf.

Taking the case of the overflow wired subgroup of the regular shelf, Fig. 1, the operation of relay 210 will, at contact 215, cause conductor C12 to be disconnected from conductor C29 and to be connected, by way of contact 216, to conductor C13. Thus if a call is initiated in a line circuit such as LC10 of the last-mentioned overflow wired subgroup, No. 10, start relay R445 of the regular common equipment unit 312 is operated over the following circuit: ground, make contact and associated armature spring RA125′, conductor C12, contact 216, Fig. 2, conductor C13, the resistance associated with the 10th start and level marking conductor of the regular shelf, conductors C315 and C327, RA441, RC443, winding of start relay R445, battery. Thus, an idle finder, such as 310, of group B is caused to hunt for a calling line in its first level; and when this calling line has been found, the connection is extended from substation A10 over the associated subscriber's line, conductor C102′, C103′ of the local finder bank cable of the regular shelf, Fig. 1, wipers 191, 192 of finder 310 in the first rotary position of the first level to the line relay, not shown, of the selector permanently associated with finder 310. The connection may then further be extended over the wipers of this selector and finally the wipers of a connector switch, not shown, to a desired other substation in the usual manner.

As mentioned above, upon the operation of transfer relay 210, Fig. 2, conductor C22 is switched, at contact 214 to conductor C23 in the same manner as conductor C12 at contact 216 is switched to conductor C13. Therefore, when a call originates, under the existing all-overflow-finder-busy condition, in the overflow wired subgroup of the above-mentioned other regular shelf, this call is taken up by an idle finder, of group A or B as the case may be, of this other regular shelf.

It was assumed above that the release of both transfer relays R340z and R440z which gave rise to the operation of relay 210, Fig. 2, was due to a simultaneous busy condition in both component groups of overflow finders. It will be understood that the same result will obtain when both these component groups have been locked out due to a defective finder in both groups or when one of the transfer relays, for example R340z is released because of an all-finders-busy-condition in the associated component group and the other transfer relay, for example R440z, is restored because of a lockout condition incident to a fault in a finder in the associated component group.

While a particular embodiment of this invention has been illustrated and described, it is to be understood that numerous modifications in the details of arrangement may be resorted to without departing from the true spirit and scope of the invention as defined in the appended claims. It should in particular be understood that if the B overflow group is not equipped, the left-hand terminal of the winding of relay 210, Fig. 2, is directly connected to armature spring RA347z of relay 340z. In that case relay 210 operates to switch conductors C12, C22 etc. in the manner described above whenever relay R340z restores.

It should be understood also that the term "shelf" as used in the present specification does not necessarily imply that all the equipment associated with it is mounted in one horizontal row. Thus a "shelf" may, also from a mounting standpoint, be a twin shelf comprising two component shelves, each component shelf for example mounting the finders and common equipment of the associated component group in one row of apparatus and, in the case of the regular shelves, the line circuits of that component group in another row of apparatus immediately above the first, the two component shelves being mounted vertically or horizontally adjacent each other.

What is claimed is:

1. In a telephone system, a main group of line circuits including a plurality of ordinary subgroups and one or more special subgroups, a regular group of line finders having access to all said ordinary and special subgroups of line circuits, allotter means associated with said finder group, start connections extending from said ordinary subgroups to said allotter means, an overflow group of line finders having access to said special subgroups, other allotter means associated with said overflow group of finders, start connections normally extending from said special subgroups to said other allotter means, and transfer relay means operative upon all the finders of said overflow group being taken into use for switching the last-mentioned start connections to the first-mentioned allotter means.

2. In a telephone system, a main group of line circuits including a plurality of ordinary subgroups and one or more special subgroups, a regular group of line finders, all said subgroups being mounted closely adjacent said regular group of line finders and being accessible therefrom, allotter means associated with said finder group, start connections extending from said ordinary subgroups to said allotter means, an overflow group of line finders, a multiple cable providing access from said overflow finders to said special subgroups of line circuits, other allotter means associated with said overflow group of finders, start connections normally extending from said special subgroups to said other allotter means, and transfer relay means operative upon said overflow group of finders becoming busy for switching the last-mentioned start connections to the first-mentioned allotter means.

3. In a telephone system, a main group of line circuits including a plurality of ordinary subgroups and one or more special subgroups, a regular group of line finders of the two-motion type having access to all said ordinary and special subgroups of line circuits, starting and level control means associated with said finder group, a start and level-marking conductor extending from each of said ordinary subgroups to said start and level control means, an overflow group of line finders of the two-motion type having access to said special subgroups, starting and level control means associated with said overflow group of finders, a start and level-marking conductor normally connected from each of said special subgroups to the starting and level control means of said overflow finder group, and transfer relay means operative upon all of the finders of said overflow group being taken into use for switching the start and level marking conductor of each of said special subgroups to the starting and level control means of said regular finder group.

4. In a telephone system, a twin group of line circuits, each of the two component groups of said twin group comprising a plurality of ordinary subgroups and at least one of said component groups also comprising one or more special subgroups; an associated twin group of regular line finders, the finders of each of the two component groups of said twin group having access to all subgroups of both component groups of line circuits but normally serving the ordinary subgroups of the associated component group only; transfer relay means associated with said line-finder group and effective when all finders of one component group are busy to assign the finders of the other component group for use by the ordinary subgroups of either component group of line circuits; an overflow group of line finders having access to and normally serving said special subgroups only; and transfer relay means associated with said overflow finders and effective when all finders of said overflow group are busy to assign to said special subgroups the finders of said twin group of regular finders for use.

5. In a telephone system, a plurality of main groups of line circuits each comprising a number of subgroups, a plurality of regular groups of line finders each having access to all the subgroups of a different one of said main groups of line circuits, an overflow group of line finders, and access connections from the last-mentioned finders to one or more predetermined subgroups from each of a number of said main groups of line circuits.

6. In a telephone system, a plurality of main groups of line circuits each comprising a number of subgroups, a plurality of regular groups of line finders each of said regular finder groups having distributor means individually associated therewith and each having access to all the subgroups of a different one of said main groups of line circuits, an overflow group of line finders said overflow finder groups having other distributor means individually associated therewith, and access connections from the last-mentioned finders to one or more predetermined subgroups from each of a number of said main groups of line circuits.

7. In a telephone system, a number of groups of line circuits each comprising a plurality of subgroups, each of a plurality of said groups comprising in addition to its ordinary subgroups one or more special subgroups; a corresponding number of regular groups of line finders each group having access to all the subgroups of the corresponding main group of line circuits; an overflow group of line finders having access to and normally serving said special subgroups; and means effective when all of the finders of said overflow group are busy to assign to any of said special subgroups the finders of its respective regular finder group for use.

8. In a telephone system, a plurality of main groups of line circuits each comprising a number of subgroups, a plurality of regular groups of line finders each having access to all the subgroups of a different one of said main groups of line circuits and each having starting means associated therewith, an overflow group of line finders having access to one or more predetermined subgroups from each of a number of said main groups of line circuits and also having starting means associated therewith, start circuits normally extending between the line circuits of said predetermined subgroups and the last-mentioned starting means for normally operating said last-mentioned means upon the initiation of a call on a line circuit in any one of said predetermined subgroups, and means operative upon all the finders of said overflow group being taken into use for switching the start circuit of each of said predetermined subgroups of line circuits to the starting means associated with the corresponding regular group of line finders.

9. In a telephone system, a plurality of regular groups of line finders each having starting means associated therewith, a corresponding number of main groups of line circuits each comprising a number of subgroups, all subgroups of each main group being mounted adjacent the corresponding regular group of line finders and being accessible therefrom, a common overflow group of line finders having starting means associated therewith, a number of multiple cables providing access from said overflow finders to one or more predetermined subgroups from each of a corresponding number of said main groups of line circuits, start connections normally extending between the line circuits of said predetermined subgroups and said overflow starting means, the origination of a call on a line circuit of one of said predetermined subgroups being normally effective by way of said circuit connections to cause said overflow starting means to start one of said overflow finders in search for said line circuit, and means operative when all of said overflow finders have been taken into use for switching the start connection of each of said predetermined subgroups of line circuits to the starting means associated with the corresponding regular group of line finders, whereby said regular starting means is operated responsive to the origination of a call on a line circuit of the associated subgroup to start one of the associated regular finders in search for said line circuit.

10. In a telephone system, a number of main groups of line circuits each of said main groups including a plurality of ordinary subgroups and at least some of said main groups including one or more special subgroups, a corresponding number of regular groups of line finders of the two-motion type, the finders of each group having access to all the subgroups of the corresponding group of line circuits, starting and level control means associated with each of said finder groups, a start and level-marking conductor extending from each of said ordinary subgroups to the starting and level control means of the corresponding finder group, an overflow group of line finders of the two-motion type having access to said special subgroups, starting and level control means associated with said overflow group of finders, a start and level-marking conductor normally connected from each of said special subgroups to the starting and level control means of said overflow finder group, and transfer relay means operative upon all the finders of said overflow group being taken into use for switching the start and level marking conductor of each of said special subgroups to the starting and level control means associated with the corresponding regular group of line finders.

11. In a telephone system, a number of twin groups of line circuits, each of the two component groups of each twin group comprising a plurality of subgroups, each of a plurality of said twin groups including in addition to its ordinary subgroups one or more special subgroups; a corresponding number of twin groups of line finders, the finders of each of the two component groups of each twin group having access to all subgroups of the corresponding two component groups of line circuits but normally serving the ordinary subgroups of the associated component group only; means effective when none of the finders of one component group is available to assign finders of the other component groups for use by the ordinary subgroups of either component group of line circuits; an overflow group of line finders having access to and normally serving said special subgroups; and means effective when all of the finders of said overflow group are busy to assign to any of said special subgroups the finders of its respective twin group of finders for use.

12. In a telephone system, a plurality of groups of line circuits, a plurality of individual groups of line finders each having access to a different group of said line circuits, a distinct group of line circuits comprising a plurality of subgroups, a common group of line finders, all of said subgroups being accessible from and normally served by said common group of line finders and different ones of said subgroups being additionally accessible from respective different ones of said individual groups of line finders, and means effective when all finders of said common group are busy for assigning to said subgroups of line circuits the finders of the respective individual finder groups for use.

References Cited in the file of this patent

UNITED STATES PATENTS

| Number | Name | Date |
|---|---|---|
| 2,214,908 | Lomax | Sept. 17, 1940 |